United States Patent [19]
Erturk et al.

[11] Patent Number: 6,135,776
[45] Date of Patent: Oct. 24, 2000

[54] HANDS-ON KIT INTERACTIVE SOFTWARE LEARNING SYSTEM

[76] Inventors: Erol Erturk; Jessica Susan Toth, both of 2020 Edinburg Ave., Cardiff, Calif. 92007

[21] Appl. No.: 09/071,139

[22] Filed: Apr. 30, 1998

[51] Int. Cl.$^7$ .................................................. G09B 23/00
[52] U.S. Cl. ........................ 434/276; 434/365; 434/118; 434/362; 434/307 R; 434/350
[58] Field of Search .................................... 434/276, 295, 434/365, 118, 350, 307 R, 362

[56] References Cited

U.S. PATENT DOCUMENTS

| | | | |
|---|---|---|---|
| 4,950,166 | 8/1990 | Williams | 434/276 X |
| 5,088,928 | 2/1992 | Chan . | |
| 5,154,615 | 10/1992 | Joubert . | |
| 5,194,031 | 3/1993 | Sahler . | |
| 5,360,344 | 11/1994 | Rishack . | |
| 5,437,552 | 8/1995 | Baer . | |
| 5,577,185 | 11/1996 | Tunnell . | |
| 5,643,085 | 7/1997 | Aityan . | |
| 5,813,865 | 9/1998 | Greenbowe et al. | 434/276 X |
| 5,820,386 | 10/1998 | Sheppard, II | 434/322 X |
| 5,871,361 | 2/1999 | Gastle et al. | 434/295 X |
| 5,934,909 | 8/1999 | Ho et al. | 434/362 X |

*Primary Examiner*—Jessica J. Harrison
*Assistant Examiner*—Chanda Harris

[57] ABSTRACT

A new and improved learning system that contains a highly interactive environment rich with educational information. The new and improved learning system contains an interactive educational software program with a companion hands-on educational activities kit. The learning system includes software which guides the user through activities, instructions, and educational material. The program's virtual expert explains material. The program also consists of several virtual machines that the user interacts with. One virtual machine holds readily accessible entertaining and scientific facts; another holds a readily accessible glossary of scientific terms. There is also a virtual machine that functions as a laboratory journal for user input of desired observations and measurements. At the completion of the project, the software compiles the user's information into an accessible final report for reading and printing. The kit is a seed growing kit with which the user experiences plant germination, anatomy, photosynthesis, and other relating educational concepts firsthand. With the help of the virtual expert, the user steps through a sequence of activities timed with plant growth. The activities generally last one to two weeks. The software delivers the necessary instructions and information for the user to successfully grow the seeds in the kit, access related facts, and input and compile observations and measurements during the learning process. The present invention has the potential for abundant educational information available from the software, the kit provides for thorough hands-on interaction with the subject, and the user is fully in control of the learning process as no supervision is necessary.

20 Claims, 12 Drawing Sheets

HANDS-ON KIT INTERACTIVE SOFTWARE LEARNING SYSTEM

BACKGROUND OF THE INVENTION

1. Field of the Invention

The present invention relates to educational tools using computer software. More particularly, the present invention relates to a new and improved learning system having an interactive software program and a hands-on kit.

2. Description of the Related Art

Criteria for Comparison

Some environments are more conducive to learning than others. We are concerned with three factors that influence learning: availability of information, interaction with the information, and control of the learning process. After a discussion of each factor, we rate the related art using these factors.

Availability of Information

Information is key to the process of learning. Over time, information has become more accessible to the public. A main factor behind this availability is that information is becoming less expensive to obtain. For example, Encyclopedia Britannica sells 32 hard-bound volumes containing 50 million words for about $1,500. The CD-ROM version of Encyclopedia Britannica, first introduced in 1994, has 72,000 articles, about 7,000 more than the printed version, and currently costs about $90.

Many educational tools are taking advantage of new technologies to provide more information. A single CD-ROM contains 650 megabytes of data which can equate to over 50 million words. That CD can be manufactured for under $1. The more information available in an educational tool, the greater the potential for learning.

Interaction with Information

Abundant, readily-accessible information is reaching more people now than ever before. However, access or exposure to large quantities of information does not necessarily lead to great knowledge. For example, a person can track years of stock market news without understanding the underlying mechanisms that drive market changes.

Knowledge requires more than just a wealth of information. To learn from information and gain knowledge, one has to interact with information, that is, actively probe it, think about it, and organize it into mental models. A recent study reported that when students experiment and explore, they exhibit greater depth of understanding and greater sense of responsibility for their work. Active, rather than passive, involvement with a subject leads to greater learning.

Feedback from the information source is a form of interaction. Direct attention and immediate response from the educator help the learner focus on the subject of study. Rewards or constructive criticism typically push the learner toward greater achievement. Feedback can come from either devices or people. The more feedback a learner receives from an educational tool, the easier it is for the learner to continue using the tool and learning.

Control of the Learning Process

The degree of control an individual has over the learning process affects how well and how much he or she learns. Library research, for example, is self-guided. The researcher controls the pace of learning and content researched. Individuals are considerably more confident and interested when they are in control, rather than when an authority dominates their environment. Technology, such as computers, empowers students because they guide the progress and determine the activities. A recent study found that one of the most positive outcomes of using technology in the learning process is greater achievement enabled by self-pacing.

In summary, the environment is ripe for learning when abundant educational information is available; the tools encourage interaction and provide feedback; and the learner controls the pace of learning.

The Related Art

Next, we examine various types of education aids including experts, models, media, computer-enabled games, and computer software. We review the advantages and disadvantages of the related art within the framework of the factors that influence learning.

Experts

Teachers and parents are examples of experts. They teach students, interact with them, facilitate projects, provide feedback, and set learning objectives. Effective experts generally do well in each of these, encouraging students to ask questions and explore further.

However, in this environment, the expert's capabilities heavily influence the effectiveness of learning. Information available to the student is bounded by the expert's knowledge. The expert, not the learner, is in control of the quantity and nature of the information.

Therefore, it would be desirable to have a new learning system that not only offers the advantages of the best experts, but also places the learner in control of the learning environment.

Models

Models, that is, hands-on kits, laboratories, and learning toys provide interactive learning environments that simulate the real world. The following are a few examples of patented educational models:

U.S. Pat. No. 5,194,031 entitled "Toy Gear Assembly" is a good example of a toy that may generate curiosity in the user. Gears move relative to each other and can be assembled differently depending on the user's ability.

U.S. Pat. No. 5,154,615 entitled "The Educational Toy" is targeted toward older users. With motors, lights, wires, gears, and switches, it resembles a small laboratory a user can explore.

U.S. Pat. No. 4,950,166 entitled "Educational Kit for Fast Cycling Plants" teaches users about plant growth. Users learn from the results of their work with the kit.

In each of these examples, the user interacts with the model and receives feedback from his or her work. As such, models provide more fertile ground for exploration than passive educational tools, like books. Another advantage is that the user is in control of the learning process.

However, there is information that the user can not glean solely from working with models. Models are more passive in delivering feedback than experts. Models, by themselves, do not provide the type of background information necessary to support what the user experiences in his or her interactions.

Therefore, it would be highly desirable to have a new learning system with such levels of interaction and user control as models provide, but with large amounts of related information and ways of readily accessing such information in a timely fashion.

Media

In this section we discuss educational tools that provide content in written, analog, or digital form. Books, videos, and encyclopedias are examples of media products. Software with programs that do more than search and sort information are discussed in a section entitled "Computer Software" below. As mentioned earlier, computers are providing alternative paths to the information in books and encyclopedias. Textbooks and other reference materials presented in electronic format have some benefits over hard-bound material. Electronic content is more suitable for searching topics. Electronic presentation can also be enriched with video and audio. Whether electronic or hard-copy though, the underlying educational tool is the same, namely, a channel that provides bulk information.

U.S. Pat. No. 5,437,552 entitled "Interactive Audio-Visual Work" takes a unique approach by putting a computer into a book. It provides written information and then reinforces that information through the built-in computer. The invention puts the user in control and has potential for a large amount of information. However, user interaction is still not as active as with a model since the interactions are contained within the framework of a computerized book. This example, though more sophisticated, is similar to other media in terms of how it rates as a learning tool.

The advantages of media are information availability and control. With media, a great deal of information can be made available to the user. Also, the learner can dictate the pace of learning. However, user interaction with the content in media education tools is passive. Electronic media may succeed in capturing the learner's attention by using creative ways of moving and advancing through the content, but the result is not necessarily a deeper level of learning. Navigating through software is no more a substitute for actively exploring a subject than flipping the pages of a book. The problem is that flat content is not like a model that encourages the user to probe and experiment with some real life situation.

Therefore, it would be highly desirable to have a new learning system that, like media, allows for user control and large quantities of information, but also provides significant user interaction and feedback.

Computer-Enabled Games

Because of their popularity, computerized games have influenced makers of educational tools. Following are examples of patents for such computer games:

U.S. Pat. No. 5,577,185 entitled "Computerized Puzzle Gaming Method and Apparatus" is a game created on a computer which uses physical laws like gravity and motion. The game is created and played on a computer.

U.S. Pat. No. 5,643,085 entitled "Two-Dimensional Cyclic Game for Creating and Implementing Puzzles" creates puzzles for the user to play with on the computer.

U.S. Pat. No. 5,088,928 entitled "Educational Board Game/Apparatus" is a board game connected to a computer. The user interacts with the board game together with the computer.

These games put the user in control. Though U.S. Pat. Nos. 5,643,085 and 5,577,185 do not, U.S. Pat. No. 5,088,928 allows for active user involvement since the environment includes a game board along with the computer. However, being merely computer games, the quantity of educational information available to the user is limited.

Therefore, it would be highly desirable to create a new learning system that has the capabilities of computerized games, namely, user control and active user interaction, but also that provides educational information.

Computer Software

Media in electronic form has advanced beyond simple electronic reference materials. Educational software developers have incorporated aspects of games into their work. The influence is obvious just from the titles of some commercial math teaching software: Math Munchers TM , NFL Math, The Great Math Adventure, and The Mighty Math Carnival Countdown. These programs place the user in control to access a lot of information. The programs also provide interaction within a virtual laboratory-type learning environment.

However, the interaction is limited to the computer screen where the virtual laboratory is displayed. Having no interactions outside the computer environment limits user involvement with the subject. These tools are also discretionary. The user has to possess self-discipline to continue coming back to them. The game aspect is therefore necessary to elevate the level of interaction and feedback between the software tool and the user.

Therefore it would be highly desirable to have an improved learning system that provides the information content and user control of software, but also offers interaction beyond the computer.

Other

U.S. Pat. No. 5,360,344 entitled "Hands-On Learning System Including a Three-Dimensional Action Model Kit" takes a new approach toward creating a learning system. The invention is centered around a model building exercise similar in principle to Legos®, but with educational emphasis. The three-dimensional action model provides the interaction component. The invention also has tools such as video players and computers in the learning environment to deliver information and complement the model.

However, this learning system would require the immediate presence of an expert or instructor to be substantially effective. The user, for example, could put together the model without having to work with the educational information. Conversely, the user could also step through the educational material without putting together the model. The learning system loses its effectiveness under these conditions because either the user misses learning from the information or the user loses the interactions with the model. The invention places the appropriate components in the environment but neglects to integrate the pieces to create a complete learning environment. As a result, an expert is required to work with the user in this learning system to provide feedback and help link the model and media, thereby not allowing the user to short circuit the overall learning process. Finally, this patent is not routinely interactive, that is the user has no incentive to return to it on a regular and routine basis.

In summary, each of the currently available educational tools have shortcomings as shown in Table 1. The positive (+) and negative (−) signs indicate the tools' ratings for each factor.

TABLE 1

|  | Information | Interaction | Control |
|---|---|---|---|
| Potential of Experts | + | + | − |
| Potential of Models | − | + | + |
| Potential of Media | + | − | + |
| Potential of Computer-Enabled Games | − | + | + |
| Potential of Software | + | − | + |
| Potential of Patent 5,360,344 | + | + | − |
| Optimal Learning System | + | + | + |

Experts maintain control of the learning environment. Models do not provide the user with abundant information. Interaction is passive when media is used alone as a learning tool. Educational information is not conveyed to the users of computer-enabled games. Computer software is similar to hard-copy media in that interaction with the subject is limited. Finally, with U.S. Pat. No. 5,360,344 the user is not in control of the learning process.

Therefore it would be highly desirable to create an optimal learning system where there is not only educational media and models but also a means for integrating the media and models thus providing an interactive environment where the pace is still controlled by the user.

SUMMARY OF THE INVENTION

Therefore, the principal object of the present invention is to create a new and improved learning system using a hands-on kit along with a software tool that delivers information and works alongside the kit.

Another object of the present invention is to customize the software program with not only educational information but also with information that renders the kit and electronic media inseparable such that the user has to interact with both.

It is a further object of the present invention to create a hands-on kit which not only requires user interaction with it but also requires interaction with the software program.

It is yet a further object of the present invention to provide software which not only contains information but also challenges the user as an expert would while still leaving the user in charge of the learning pace.

Briefly, the above and further objects of the present invention are realized by providing a new and improved learning system with a highly interactive environment that is rich with educational information. The new and improved learning system contains an interactive educational software program with a companion hands-on educational kit. In addition, it is inexpensive to produce.

The learning system includes software which guides the user through activities, instructions, and educational material. The program's virtual expert can be asked to explain and re-explain instructions, activities, and material. The program also consists of several virtual machines that the user interacts with. One virtual machine holds entertaining and scientific facts; another holds a readily accessible glossary of scientific terms. There is also a virtual machine that functions as a laboratory journal for user input of observations and measurements. These data are recorded and tracked by the user. The virtual machines and the virtual expert leave the user in control to set the pace. At the completion of the project, the software compiles the user's information into an accessible final report for reading and printing. The report is the end-product representing the learning achieved during the course of the project. The report is the reward for the work the user accomplishes. The user can continue to explore more information within the software after the completion of the project.

The hands-on educational kit is a seed growing kit with which the user experiences plant germination, anatomy, photosynthesis, and other relating concepts firsthand. With the help of the virtual expert, the user steps through a sequence of activities timed with plant growth. The activities generally last one to two weeks. The software delivers the necessary instructions and information for the user to successfully grow the seeds in the kit, access related facts, and input and compile observations and measurements during the learning process.

The present invention is routinely interactive: the user continues returning to the learning system to build on the knowledge gained in previous work. The user takes responsibility for the work, that is, if he or she does not progress with the activities, the plants will die. Experiences with the kit generate curiosity, motivating the user to probe the educational material on the software. Therefore, the software and kit work together to create an optimal learning system. The present invention has the potential for abundant educational information available from the software. The kit provides for thorough hands-on interaction with the subject. The user is fully in control of the learning process as no supervision is necessary.

The current version delivers the electronic content to the user via CD-ROM. Other delivery methods, such as downloading through a web site or a server, are also possible and contemplated by this disclosure.

The current version uses a seed growing kit as a hands-on educational kit to study life sciences. This invention is not limited to the topic of seed growing or life sciences. There are other concepts possible and contemplated by this disclosure for use with the present invention.

The current version also assumes a single user in isolation, however, collaboration among many users to share the educational experience in the same learning environment is possible and contemplated by this disclosure.

In the current version, the target user is 8 to 12 years old. However, other versions of the invention could be aimed at older or younger audiences simply by tailoring the software or the kit or both to fit the age or experience level of the contemplated users.

DETAILED DESCRIPTION OF THE INVENTION

Figure 1:
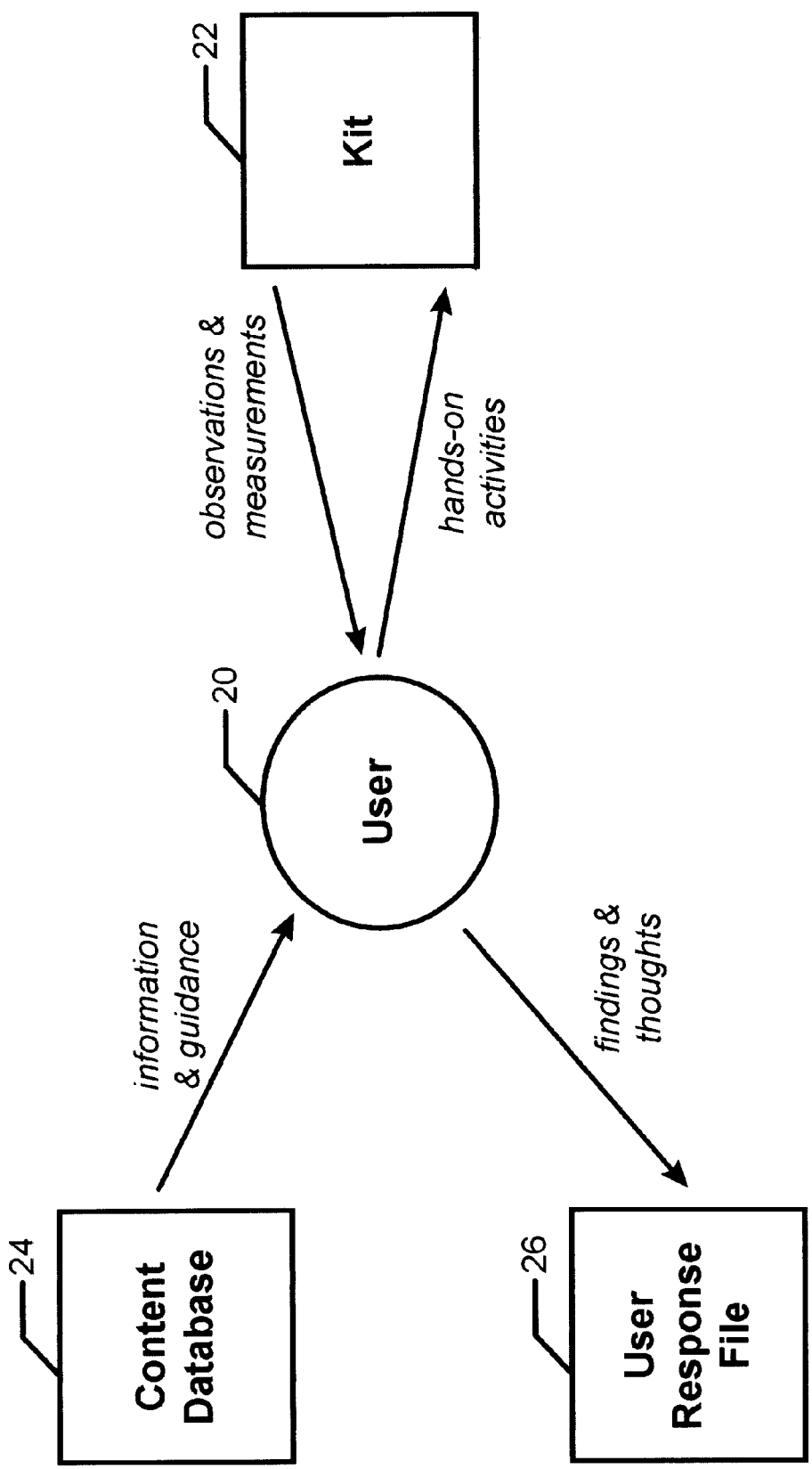
FIG. 1 illustrates a schematic overview of the hands-on kit interactive software system according to the present invention.

A typical embodiment according to the present invention is illustrated in FIG. 1, which shows a schematic overview of the present invention.

A user 20 is at the center of activities. He or she interacts with a kit 22, database content 24, and a user response file 26. The user 20 completes hands-on activities using the kit 22, making observations and taking measurements. The user 20 receives kit activity guidance and related educational information from the database content 24. The user 20 inputs his or her findings and thoughts in the user response file 26. The topic of the current embodiment is plant growth. The kit 22 and the database content 24 are oriented toward teaching about plant growth.

Components of the kit 22 are shown in FIGS. 2A–2D. The kit 22 is composed of laboratory tools which the user uses to experiment with seed germination and growth. The tools include a petri dish 28, cheese cloth 30, seeds 32, a cloth cover 34, a magnifying glass 36, and a ruler 38.

The petri dish 28 is the container which holds the seeds 32 and the cloths (30, 34). It also holds water for plant nourishment. It is approximately 15 centimeters (6 inches) in diameter and 1.25 centimeters (0.5 inches) deep.

The cheese cloth 30 is folded in a manner such that the mesh on each fold do not line up. The cheese cloth 30 is important for successful seed germination and growth for three reasons. First, it is made of water-absorbent material which maximizes moisture delivered to the seeds 32. Next, it has mesh big enough to let plant roots through, enabling the plant to grow upright. Finally, it is substantial enough to block light from getting to the roots thereby protecting them.

A variety of seeds 32 capable of germination are provided, including but not limited to lentils, red beans, white beans, and garbanzo beans. The seeds 32 were chosen because of their size and their ease of growth. Lentils germinate fast and grow quickly. Red and white beans are easy to observe and manipulate. Garbanzo beans are unique from the others in their shape and growth pattern. Alternatively, other seed types capable of germination could be included.

The cloth cover 34 is made of absorbent material to keep the seeds 32 moist. It functions to protect the seeds 32 and roots from drying out early in the plants' lives. Once the plants start turning green and their roots go below the cheese cloth 30, this cover is removed.

The magnifying glass 36 is hand-held. The ruler 38 is approximately 15 centimeters (6 inches). The magnifying glass and ruler are used for making observations and taking measurements.

Figure 2A:
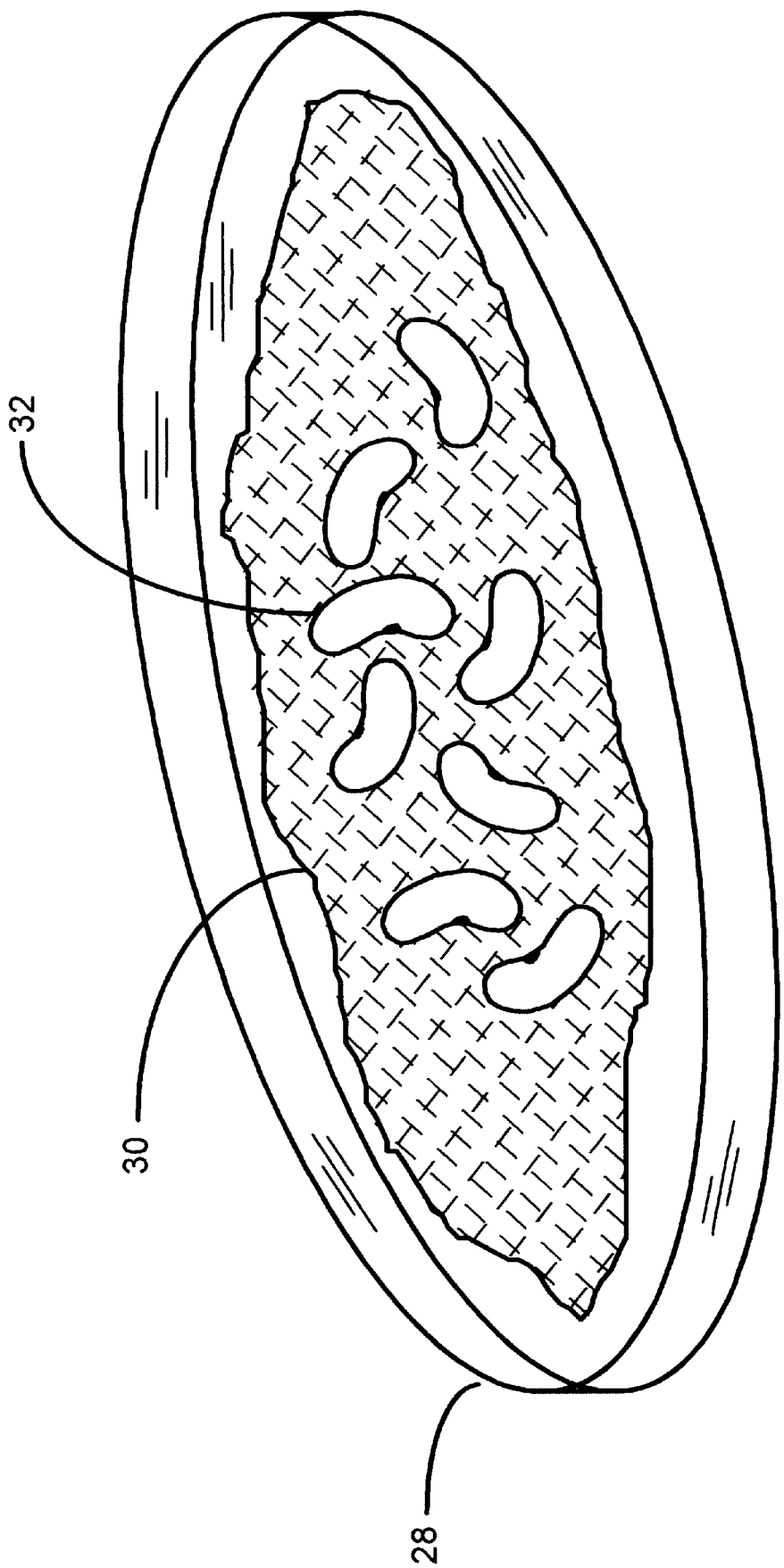
FIG. 2A is a perspective view of the hands-on educational kit petri dish assembly.
Figure 2C:
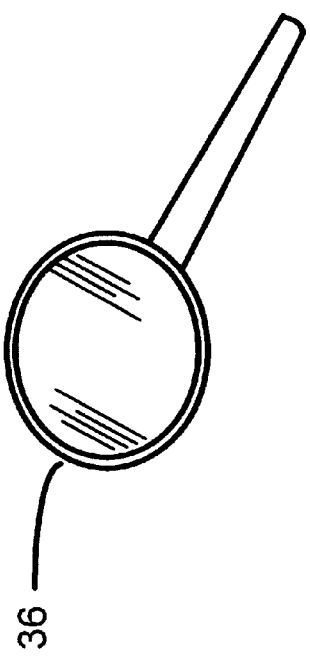
FIG. 2C is a top view of the magnifying glass.
Figure 2D:
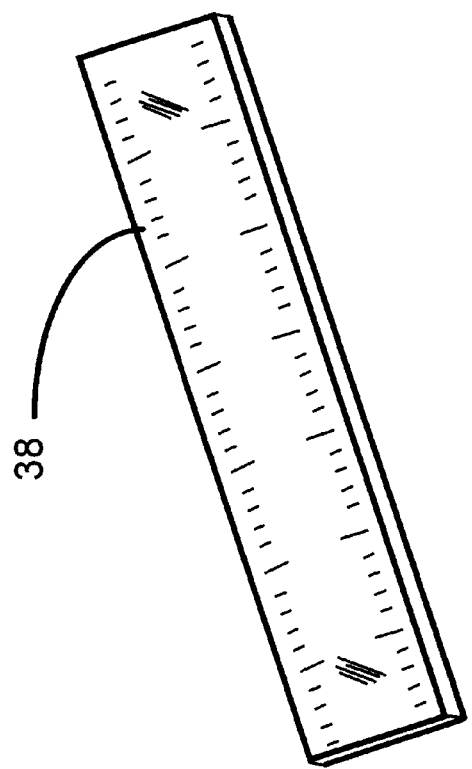
FIG. 2D is a perspective view of the ruler.
Figure 2B:
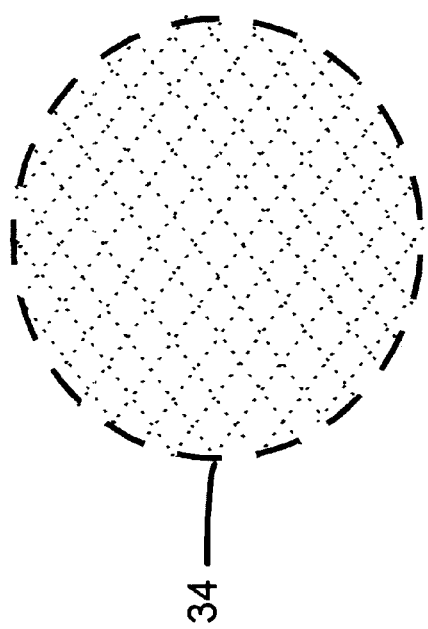
FIG. 2B is a top view of the cloth cover which is placed over the seeds in the petri dish.

FIG. 2A shows the petri dish assembly, made up of the petri dish 28, the cheese cloth 30, and the seeds 32. The cheese cloth 30 lies inside the petri dish 28 and the seeds 32 rest on top. The cloth cover 34, shown in FIG. 2B, is placed on top of the petri dish assembly when the plant roots are young to minimize the light on them. After 5–7 days the cloth cover 34 is removed and discarded.

As an alternative to the components illustrated in FIGS. 2A–2D, the kit could be composed of items that support learning in another subject. Many possible hands-on kit activities are contemplated by this disclosure.

Figure 3:
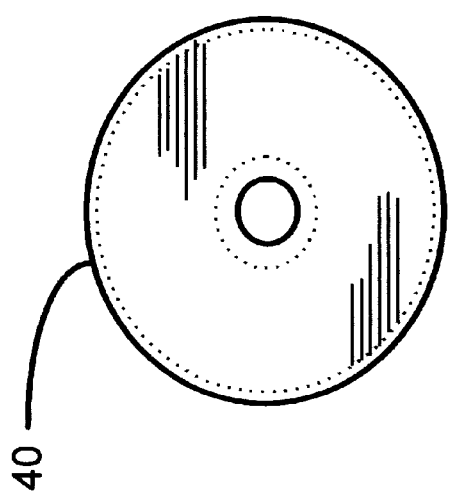
FIG. 3 is a top view of the CD-ROM.

A CD-ROM 40 is depicted in FIG. 3. It holds the database content 24 and a software program that directs the project. The database content 24 complements the kit activities. Alternatively, the database content could be distributed by other low-cost means, for example magnetic media or over the Internet. The preferred embodiment of the present invention is to distribute the software program and content database via CD-ROM.

Figure 4:
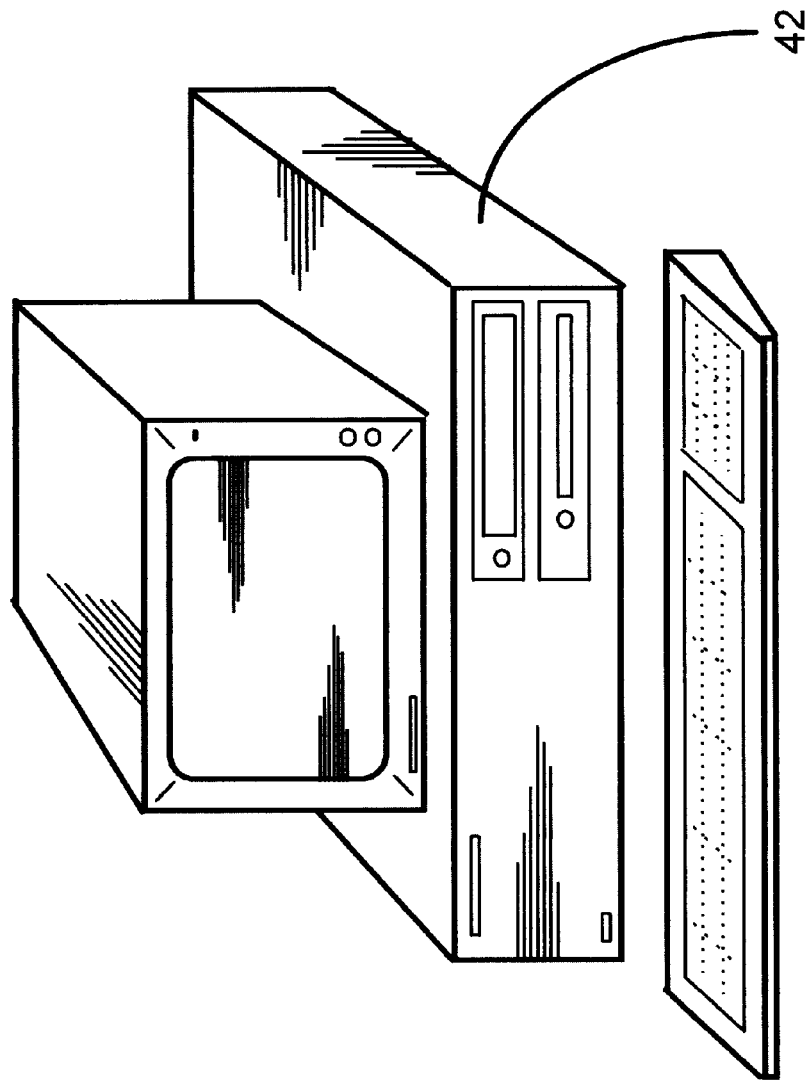
FIG. 4 is a perspective view of the computer.

A computer 42 is depicted in FIG. 4. The software program runs on the computer. The computer 42 accesses the database content 24 from the CD-ROM. The user response file 26 is stored on the hard drive of the computer 42. Alternatively, a dedicated computerized device, such as a hand-held computer that only runs software for the instant hands-on kit interactive software learning system, could also be used.

Figure 5B:
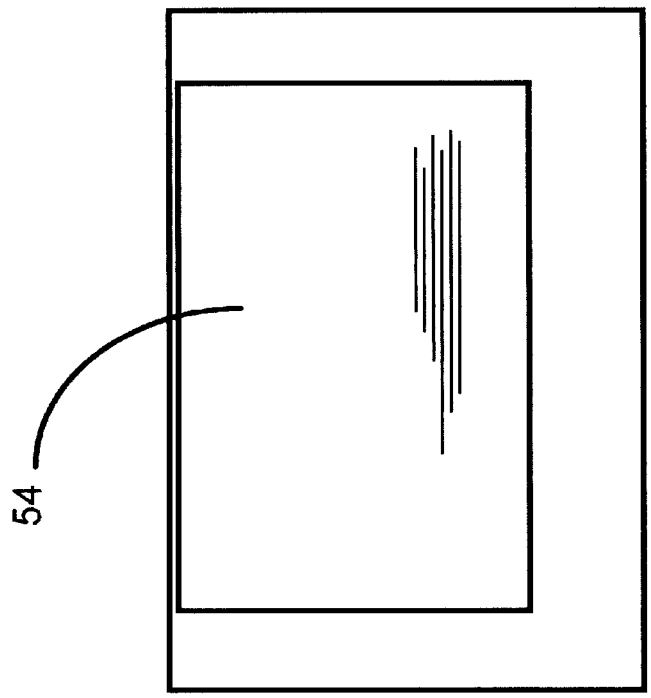
FIG. 5B illustrates the secondary software interface screen called the viewing screen, according to the present invention.
Figure 5A:
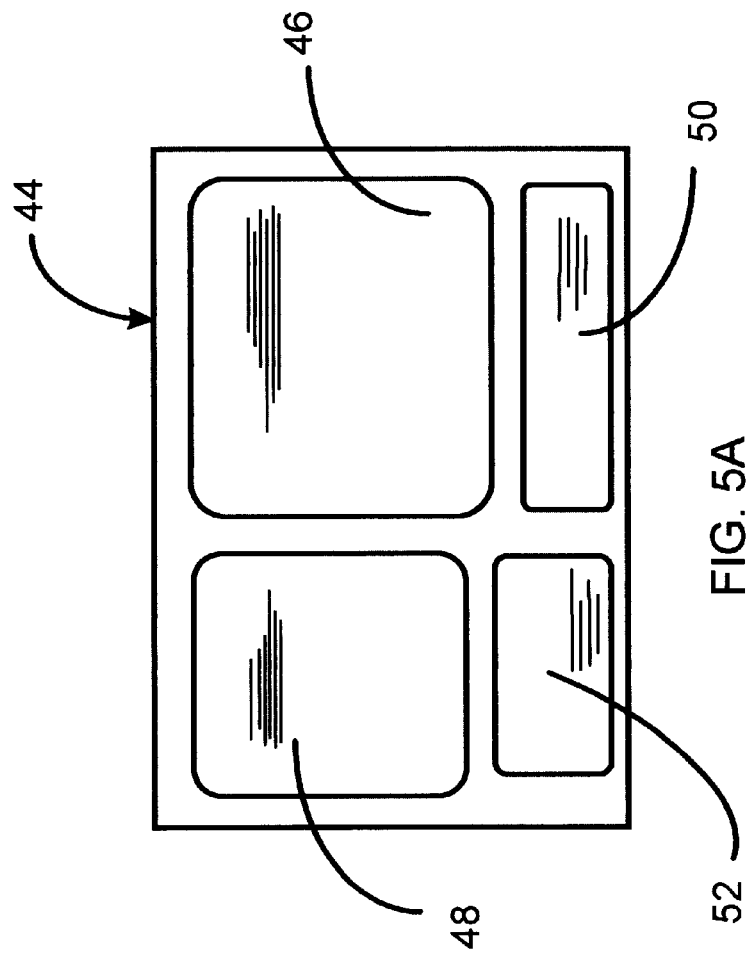
FIG. 5A illustrates the main software interface screen called the control panel, according to the present invention.

The user interfaces to the software program are shown in FIGS. 5A and 5B. The main user interface is a control panel 44. It has four separate interfaces or virtual machines. At run-time, a virtual expert 46 appears in the upper-right portion of the control panel 44. A journal 48 is presented in the upper-left of the control panel 44. A list of relevant facts 50 are displayed in the lower-right. A list of glossary terms 52 are displayed in the lower-left. A viewing screen interface 54 displays information requested by the user 40.

The virtual expert 46 is provided in video format. The virtual expert 46 interacts directly with the learner, presenting new concepts, guiding activities and inquiring about progress with the kit 22. The virtual expert 46 can respond in different ways based on input from the user 20. The user 20 can stop and replay information from the virtual expert 46 as needed.

The journal 48 is a virtual machine that prompts the user 20 with questions at specific points during the virtual expert's discussion. The user 20 enters responses, observations, and measurements in the journal 48. When the user 20 requests, the information entered in the journal 48 is compiled into a report 56. The report 56 is displayed on the viewing screen 54, which slides down and covers a portion of the control panel 44.

The list of relevant facts 50 are presented as a scrolling list of titles. When the user 20 selects a title, the viewing screen 54 slides down and displays the information. Similarly, the list of glossary terms 52 are displayed as a scrolling list of terms. When the user 20 selects a term, the viewing screen 54 slides down and shows the definition.

Figure 6:
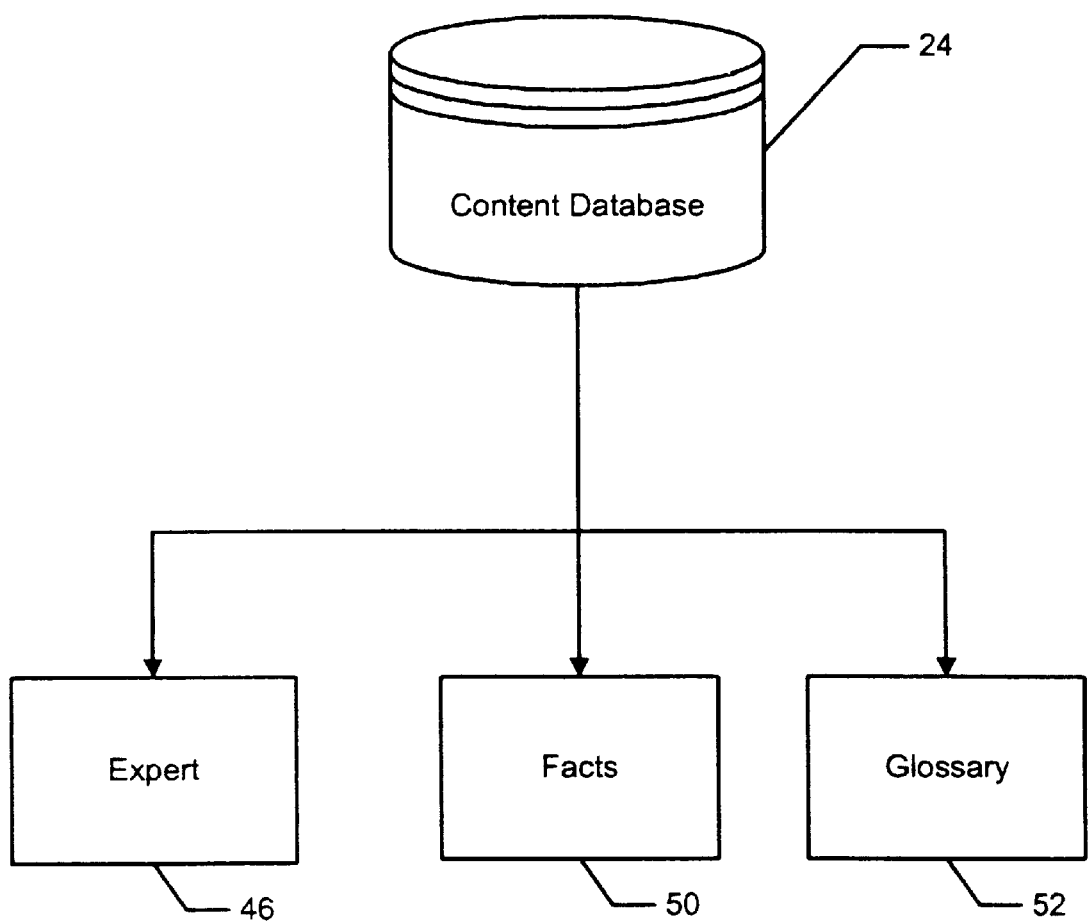
FIG. 6 illustrates the content database information flow.

FIG. 6 indicates how content flows to and from the content database 24. The expert 46 guides the user 20 through kit activities with explanations and instructions. The list of relevant facts 50 delivers facts related to the current topic. The list of glossary terms 52 provides definitions of terms related to the current activities. The content database 24 provides content to each of the interfaces: the expert 46, the relevant facts 50, and the glossary terms 52. That is, content for each of the interfaces is stored in and accessed from the content database 24.

Figure 7:
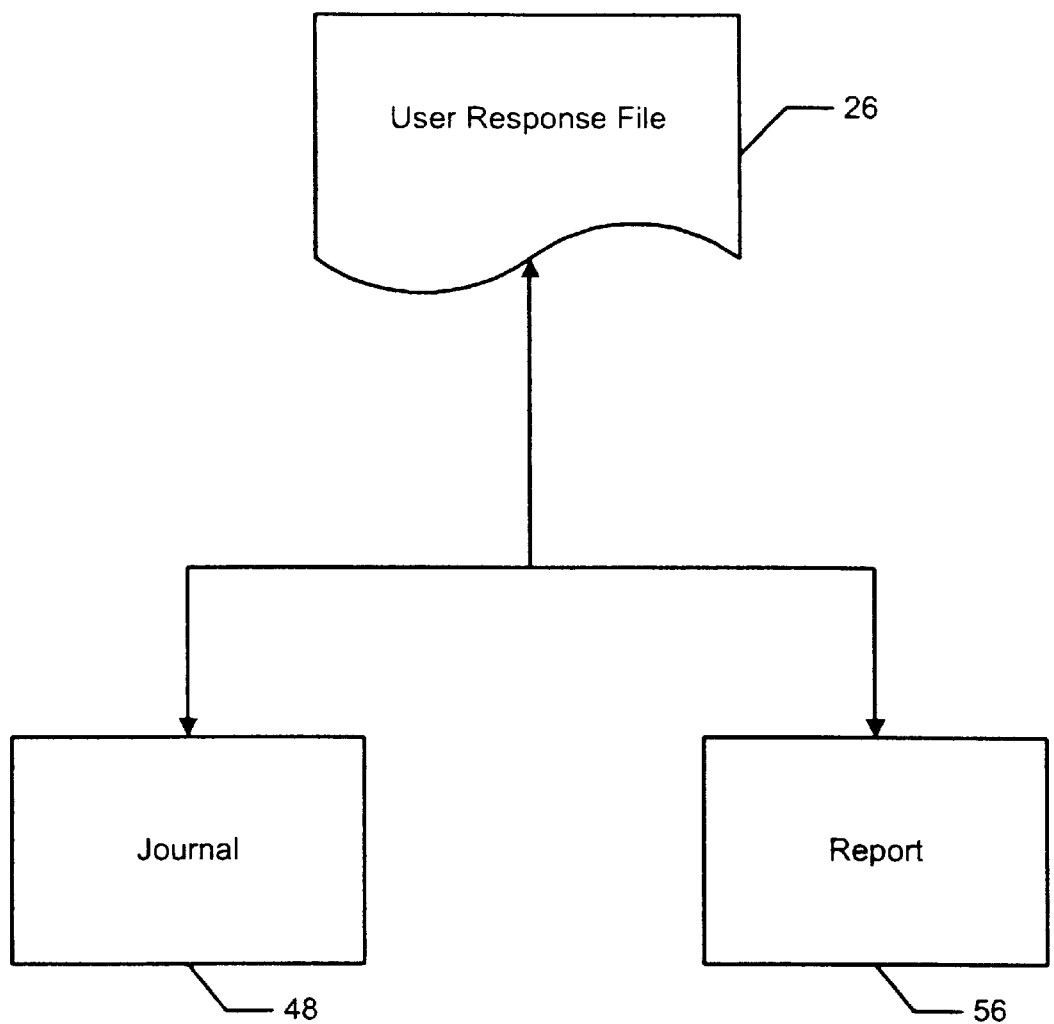
FIG. 7 illustrates the user response file information flow.

FIG. 7 indicates how information flows to and from the user response file 26. The user response file 26 is a read-write access file. It contains all user input. The user 20 enters information into the journal 48. That information is stored in and later retrieved from the user response file 26. The user 20 can view and print information entered in the journal 48 from the report 56. The information for the report 56 is also stored in and later retrieved from the user response file 26.

In the present invention, the user response file 26 is stored on the hard-drive of the computer 42. Alternatively, the information could be stored on any read-write magnetic or optical medium. It could be maintained either where the computer 42 is physically located or at a remote location. As an example, the computer 42 could be located at the user's home while the user response file 26 is located at school. Then the journal 48 and the report 56 could access data held in the user response file 26 via electronic data transfer, such as over the Internet.

Figure 8:
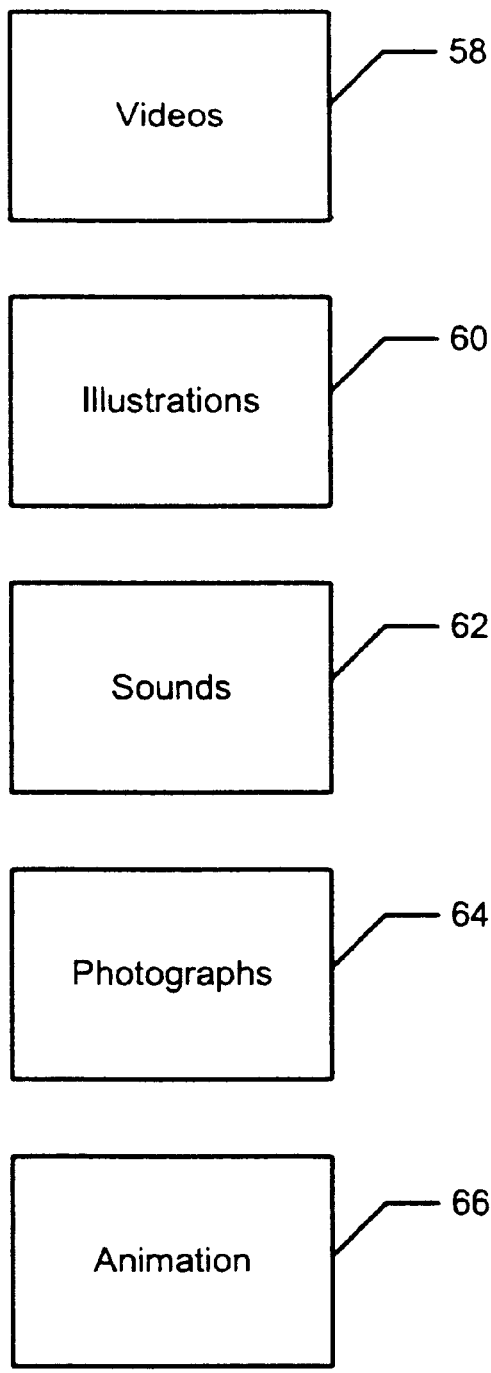
FIG. 8 illustrates the composition of the content database.

The content database 24 is read-only and contains multimedia content that is displayed at runtime. The types of content in the content database 24 are depicted as a block diagram in FIG. 8. They are videos 58, illustrations 60, sounds 62, photographs 64, and animation 66. As described in the discussion of FIG. 6, the content database 24 provides information to the expert 46, the facts 50, and the glossary 52. Content is held in individual files, for example, a video 58 of the expert 46 is contained in a single file. In the present invention, there are approximately 100 files of video 58, 100 files of illustrations 60, 25 files of sound 62, 150 files of photographs 64, and 10 files of animation 66. The multimedia components are also mixed during an individual presentation. For example, a single video 58 may have music, sound 62, illustrations 60, and photos 64 integrated within it.

Program Procedures for a Typical Visit

Figure 9A:
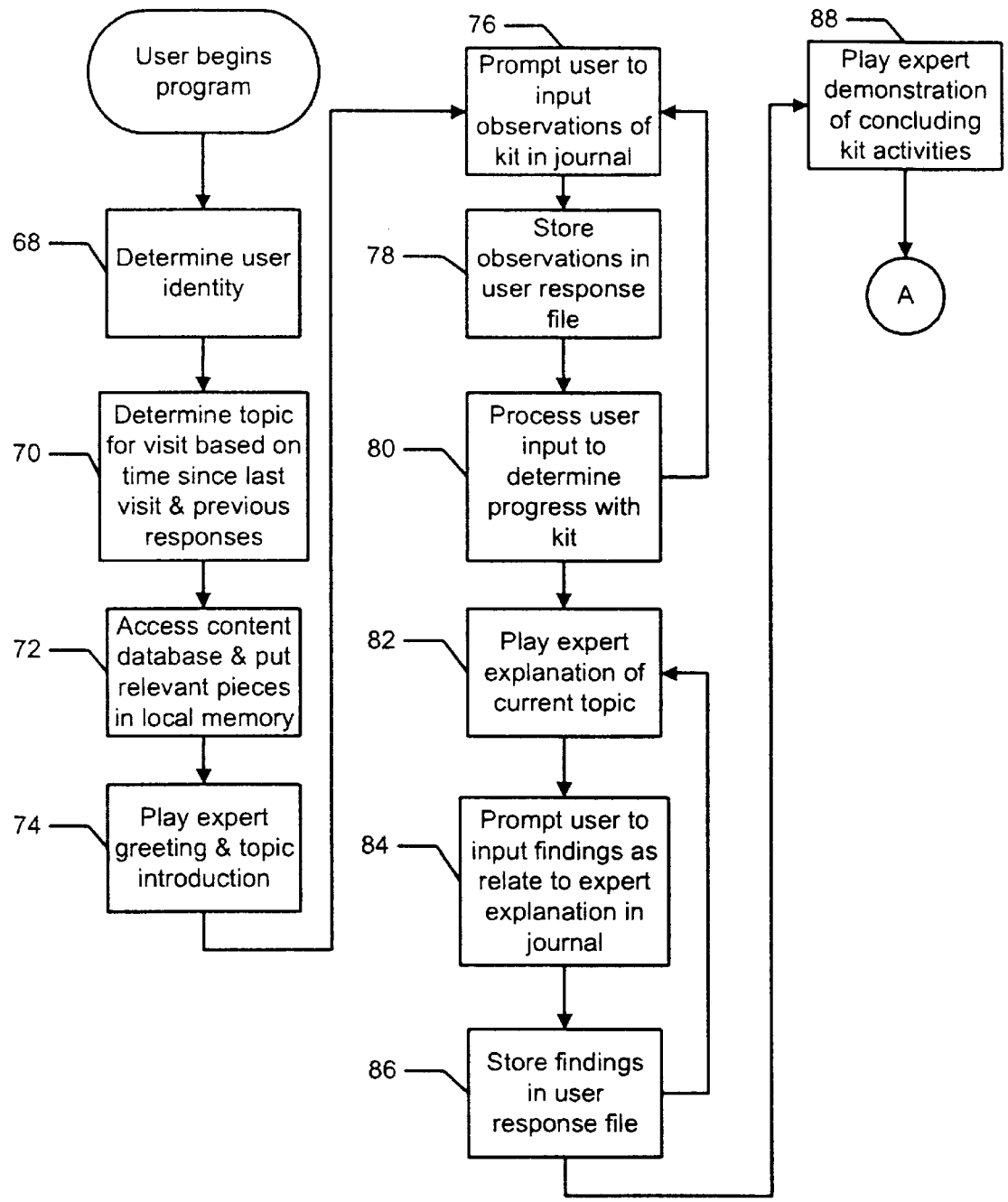
FIG. 9A is a flow chart outlining the software program procedures for a typical visit to the computer by the user, according to the present invention.
Figure 9B:
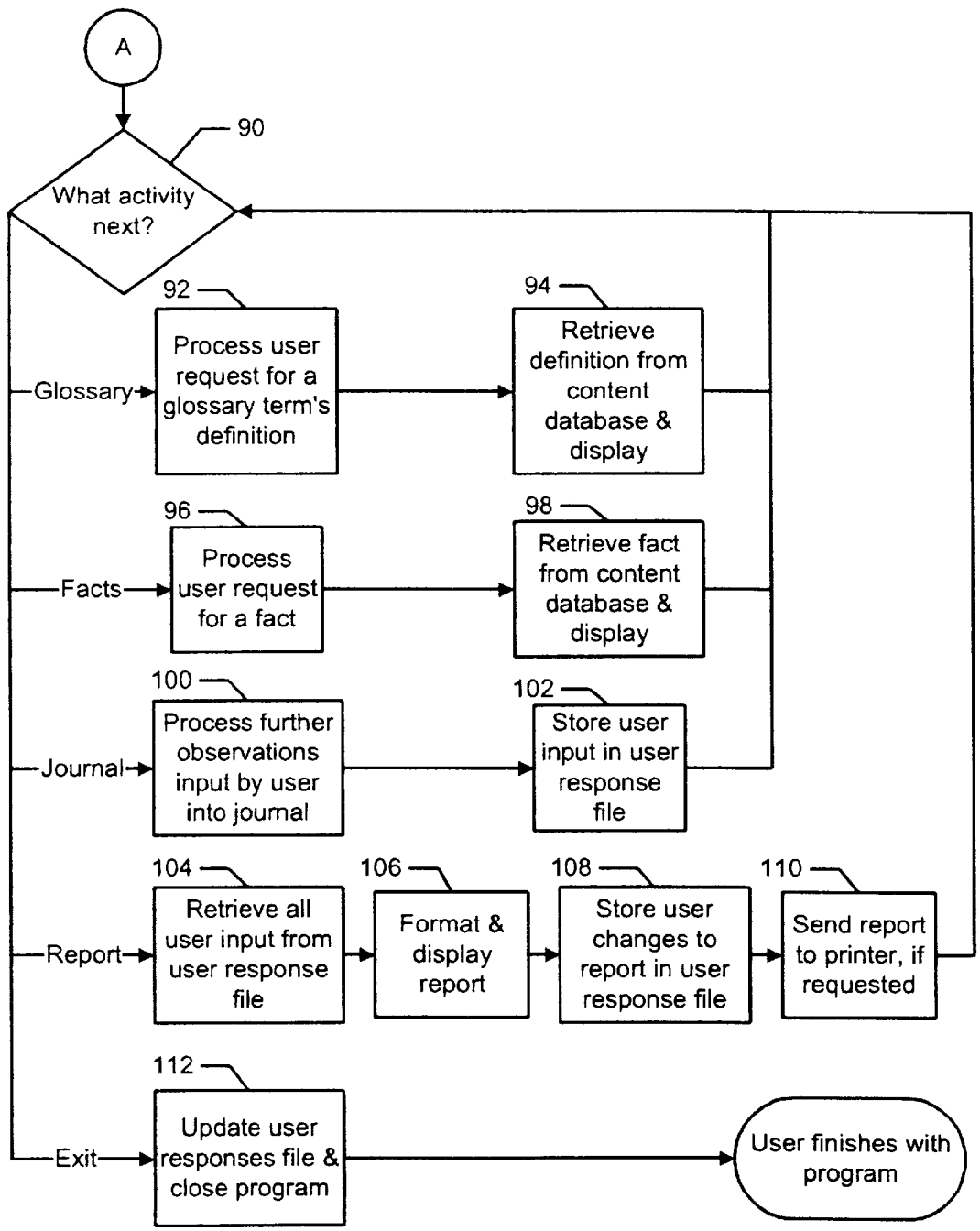
FIG. 9B is a continuation of FIG. 9A.

FIGS. 9A and 9B outline the flow of the software program pertaining to the operation of the invention. Each visit to the software by the user 20 triggers a series of activities that the user 20 steps through as shown in FIGS. 9A and 9B.

Upon starting the program, the program queries the user 20 to determine the user's identity (step 68). The program then determines the topic for the visit, based on time since the last visit, the completeness of the user's previous responses (step 70), and the state of developments within the seed growing kit. The program then accesses the content database 24 and places relevant information pieces for the expert 46, the facts 50, and the glossary 52 into local memory (step 72). The program plays a greeting from the expert 46, who then introduces a specific topic (step 74). Material for the topic includes kit instructions, educational information, and fun tidbits. The program prompts the user 20 to make observations of the kit 22 and enter them in the journal 48 (step 76). The observations are stored in the user response file 26 (step 78). The program processes user inputs to determine the user's progress with the kit 22 (step 80). The program may then repeat steps 76–80, getting, storing, and processing more user input.

Next, the program plays the expert 46 discussing an aspect of the current topic (step 82). Then the user 20 is prompted to relate the expert's explanation to his or her own observations and enter the findings in the journal 48 (step 84). The findings are stored in the user response file 26 (step 86). The program repeats steps 82–86 until the expert 46 has completed the topic. The expert 46 demonstrates how to store the kit 22 until the next visit (step 88).

The program then allows the user 20 to choose the next activity (step 90). When the user 20 selects a specific glossary term from the glossary listing 52, the program processes the request, identifying the definition that corresponds to the term (step 92). It then retrieves the definition from the content database 24 and displays the information (step 94).

When the user 20 selects a particular fact from the facts listing 50, the program processes the request (step 96). It then retrieves the fact information from the content database 24 and displays it (step 98).

When the user 20 inputs further observations in the journal 48, the program processes the information (step 100) and stores it in the user response file 26 (step 102).

When the user 20 indicates he or she wants to view the report 56, the program accesses the user response file 26 and retrieves user input from all visits by this user (step 104). It then formats the information and displays the report 56 (step 106). Any changes the user 20 makes to the report 56 are stored in the user response file 26 (step 108). If the user 20 requests a printout, the program sends the report 56 to be printed (step 110).

The program processes successive activities as requested by the user 20, looping through steps 90–110. The content available in the glossary listing 52 and the fact listing 50 can vary depending on the date and the frequency of the user's visits. The user 20 can stay in the program and explore as long as he or she wishes. When the user 20 wants to exit, the program updates the user response file 26 and closes the program (step 112).

User Interaction during a Typical Visit

Figure 10A:
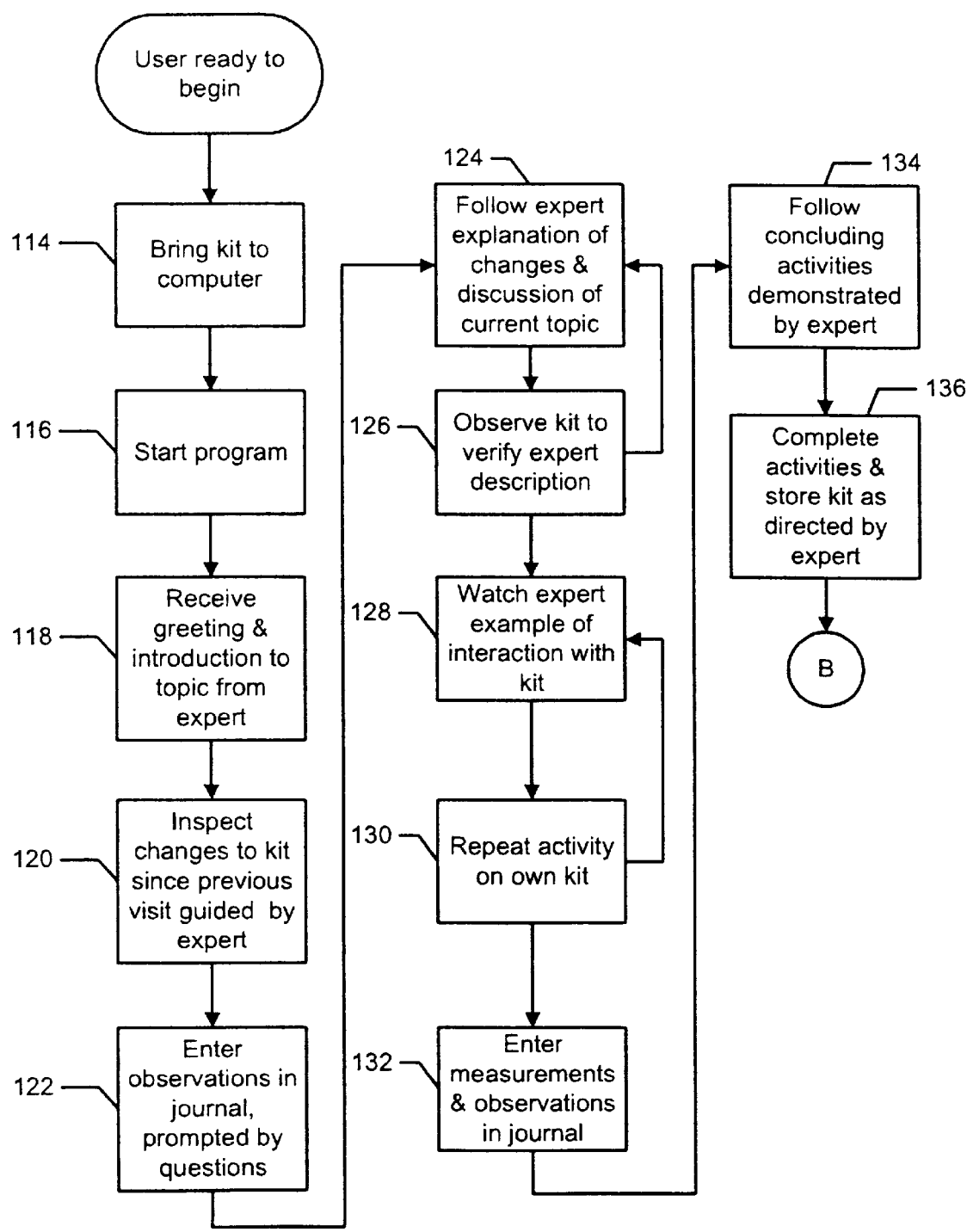
FIG. 10A is a flow chart outlining the typical user interactions with the interactive software and hands-on educational kit, according to the present invention.
Figure 10B:
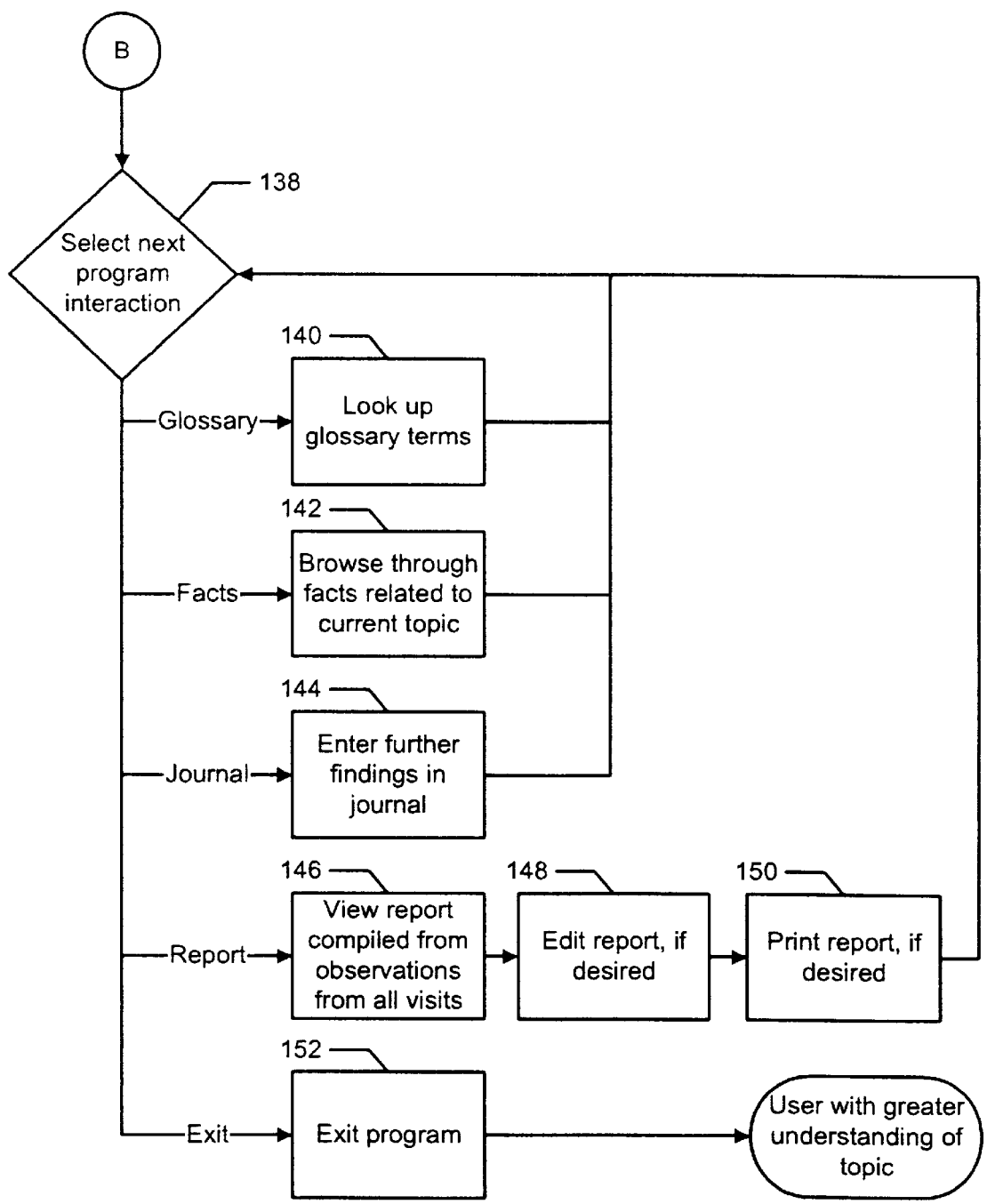
FIG. 10B is a continuation of FIG. 10A.

FIGS. 10A and 10B outline the activities and interactions of the user 20 with the computer 42 and the kit 22. This flow steps through a typical visit from the perspective of the user 20. As such, it includes work with the kit 22. In contrast, the previous flow (shown in FIGS. 9A and 9B) steps through a typical visit from the perspective of the software program's procedures.

To begin a typical visit, the user 20 brings the kit 22 to the computer 42 (step 114). The user 20 starts up the program on the computer 42 (step 116). Next, the user 20 receives a greeting from the expert 46, who then introduces the topic for the current visit (step 118). The expert 46 directs the user 20 to look for specific changes to the seeds 32 since the last visit (step 120). The user 20 is prompted by verbal questions from the expert 46 and written questions in the journal 48 to enter observations in the journal 48 (step 122). Next the user 20 follows an explanation of the changes witnessed in the seeds 32 and a general discussion of the visit topic (step 124). This is delivered by the expert 46 with supporting illustrations 60, sounds 62, photographs 64, animation 66, and other videos 58 from the content database 24. The user 24 observes the kit 22 to confirm the descriptions (step 126). The expert 46 explains and the user 20 verifies until the discussion is complete (steps 124–126).

Next, the user 20 follows a demonstration by the expert 46 of a specific experiment with the seeds 32 (step 128) and repeats the activity with the kit 22 (step 130). The user 20 enters measurements and observations in the journal 48, directed by verbal and written prompts (step 132). The user 20 follows the example of the expert 46 (step 134), completing the visit activities and storing the kit 22 (step 136).

Then, as shown in FIG. 10B, the user 20 selects the next program interaction desired (step 138). By choosing from the glossary listing 52, the user 20 is able to view a glossary definition (step 140). By selecting from the facts listing 50, the user 20 can browse facts related to the topic discussed by the expert 46 earlier (step 142). The user 20 may choose to enter more observations in the journal 48 (step 144). The user 20 may choose to view the report 56, which is compiled from all observations from the current and previous visits (step 146). The user 20 may then edit the report 56 (step 148) and print it (step 150). After completing whatever activities the user 20 wants (steps 138–150), the user 20 exits the program (step 152).

It should be understood, however, that even though these numerous characteristics and advantages of the invention have been set forth in the foregoing description, together with details of the structure and function of the invention, the disclosure is illustrative only, and changes may be made in detail, especially in matters of kit type, educational content, and software architecture within the principal of the invention to the full extent indicated by the broad general meaning of the terms in which the appended claims are expressed.

What is claimed is:

1. An interactive learning system comprising:

a computer;

a computer program for directing an interactive learning process independent from said computer;

a hands-on interactive educational kit having inherent interactivity independent of that of said computer;

a computer implemented and controlled content database containing accessible information, instruction and guidance for a user related to said hands-on interactive educational kit;

whereby said hands-on interactive educational kit adapted for multiple hands-on learning activities having interactivity independent from said computer, includes directed activities related to the gathering of observations, the making of measurements and through following said hands-on kit instructions, the inputting of requested data into said computer program in a timed and routine fashion; and a user response file generated by the input from a user directly related to said independently interactive hands-on kit activities for the purpose of creating a journal of said hands-on kit activities, and for recording the findings and thoughts of the user in relation to the computer program directed and computer independent interactive hands-on kit activities.

2. An interactive learning system according to claim 1, wherein said computer program for directing an interactive learning process is contained on magnetic media in a stored readable format.

3. An interactive learning system according to claim 1, wherein said computer program for directing an interactive learning process is contained on optical media in a stored readable format.

4. An interactive learning system according to claim 3, wherein said computer program for directing an interactive learning process is contained on a CD-ROM in a stored readable format.

5. An interactive learning system according to claim 1, wherein said computer implemented and controlled content database containing accessible information, instruction and guidance for a user, and said hands-on educational kit adapted for multiple hands-on learning activities including the gathering of observations, the making of measurements and the inputting of requested data into said computer program in a timed and routine fashion, are coordinated, sequenced and timed in such a manner as to make the learning system actively routinely interactive in multiple sessions for a user.

6. An interactive learning system according to claim 1, wherein said computer program for directing an interactive learning process includes said computer implemented and controlled content database containing accessible information, instruction and guidance related to said hands-on educational kit, whereby a user would access desired information, instructions or guidance for the purpose of interacting with said computer program and hands-on educational kit.

7. An interactive learning system according to claim 1, wherein said hands-on educational kit comprises:

a collection of numerous various seeds capable of germination;

a petri dish;

a cheese cloth growth platform;

a cloth seed cover;

a magnifying glass; and a ruler, whereby a user would interact in a timed and routine fashion with said computer program and said hands-on educational kit to make observations and take measurements for the purpose of learning.

8. An interactive learning system according to claim 1, wherein said computer implemented and controlled content database provides a user with a virtual expert, facts and a glossary related to said hands-on educational kit for the purpose of directing and guiding the learning process.

9. An interactive learning system according to claim 1, wherein said user response file generated by the input from a user related to said hands-on kit activities is accessible, readable and enables printing hard copy of a report.

10. An interactive learning system according to claim 1, wherein said computer program includes a series of virtual multitasking functions comprising:

an expert to inform and guide a user;

a journal for user input of observations and measurements;

a list of facts related to said hands-on kit educational activities; and a glossary of said hands-on kit related scientific and technical terminology.

11. An interactive learning system according to claim 1, wherein said computer implemented and controlled content database includes stored, indexed, and readily available information related to said hands-on educational kit activities in the form of videos, sounds, illustrations, photographs and animation.

12. A method of interactive learning comprising the steps of:

providing a computer;

providing a computer program for directing an interactive learning process independent from said computer;

providing a hands-on interactive educational kit having inherent interactivity independent of that of said computer;

providing a computer implemented and controlled content database containing accessible information, instruction and guidance for a user related to said hands-on interactive educational kit;

providing a hands-on interactive educational kit adapted for multiple hands-on learning activities having interactivity independent from said computer, including directed activities related to the gathering of observations, the making of measurements and through following said hands-on kit instructions, the inputting of requested data into said computer program in a timed and routine fashion; and generating a user response file using the input from a user directly related to said independently interactive hands-on kit activities for the purpose of creating a journal of said hands-on kit activities, and for recording the findings and thoughts of the user in relation to the computer program directed and computer independent interactive hands-on kit activities.

13. A method of interactive learning according to claim 12, wherein said step of providing a computer program for directing an interactive learning process is carried out by providing said program stored in a readable format on magnetic media.

14. A method of interactive learning according to claim 12, wherein said step of providing a computer program for directing an interactive learning process is carried out by providing said program stored in a readable format on optical media.

15. A method of interactive learning according to claim 14, wherein said step of providing a computer program for directing an interactive learning process is carried out by providing said program stored in a readable format on CD-ROM.

16. A method of interactive learning according to claim 12, wherein said step of providing a hands-on educational kit adapted for multiple hands-on learning activities including the gathering of observations, the making of measurements and the inputting of requested data into said computer program in a timed and routine fashion is carried out by providing said hands-on kit directed at plant growth learning activities.

17. A method of interactive learning according to claim 12, wherein the step of providing a computer program for directing an interactive learning process is carried out by providing said computer program including a series of virtual multitasking functions comprising:

an expert to inform and guide a user;

a journal for user input of observations and measurements;

a list of facts related to said hands-on kit educational activities; and a glossary of said hands-on kit related scientific and technical terminology.

18. A method of interactive learning according to claim 12, wherein the step of generating a user response file using the input from a user related to said hands-on kit activities for recording the findings and thoughts of the user in relation to the directed activities is carried out by said computer program for directing an interactive learning process, whereby said user response file is readily accessible, readable and printable.

19. A method of interactive learning according to claim 12, wherein said steps of providing a computer implemented and controlled content database containing accessible information, instruction and guidance for a user, and the step of providing a hands-on educational kit adapted for multiple hands-on learning activities including the gathering of observations, the making of measurements and the inputting of requested data into said computer program in a timed and routine fashion, are coordinated, sequenced and timed in such a manner as to make the learning system actively routinely interactive in multiple sessions for a user.

20. A method of interactive learning according to claim 12, wherein said step of providing a computer implemented and controlled content database is carried out by storing, indexing, and making readily available information related to said hands-on educational kit activities in the form of videos, sounds, illustrations, photographs and animation.

* * * * *